SERVO SYSTEM INCLUDING DIFFERENTIAL AND UNBALANCE AMPLIFIERS
Filed Sept. 25, 1967
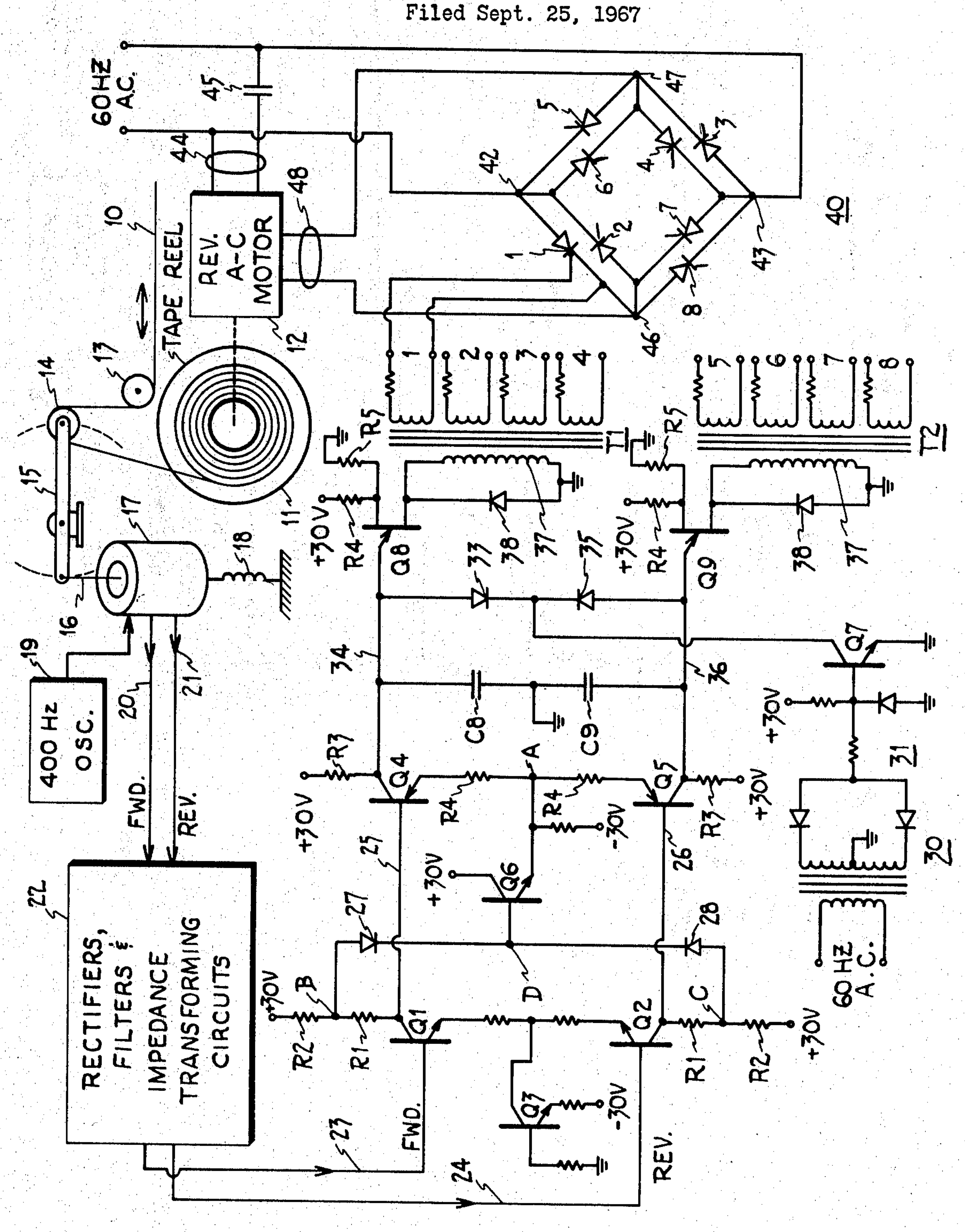
INVENTORS
DAVID W. HALL, II
EMRYS C. JAMES
BY Carl V. Olson
ATTORNEY 3,566,295

SERVO SYSTEM INCLUDING DIFFERENTIAL AND UNBALANCE AMPLIFIERS

David W. Hall II, and Emrys C. James, Palm Beach, Fla., assignors to RCA Corporation, a corporation of Delaware Filed Sept. 25, 1967, Ser. No. 670,241
Int. Cl. H03f 3/68
U.S. Cl. 330—30 8 Claims

ABSTRACT OF THE DISCLOSURE

A tape loop servo system of the type including sensing means providing forward and reverse input signals having amplitudes which are equal when no motion is called for and having amplitudes which are unequal when motion in one direction or the other is called for. A differential amplifier includes two normally-conducting transistors each having an input electrode receptive to a respective one of the forward and reverse signals. An unbalance amplifier includes two normally-nonconducting transistors each having first and second input electrodes, the first input electrodes being receptive to outputs from respective ones of the differential amplifier transistors. Two diodes and an additional transistor couple the equal or greater one of the outputs of the differential amplifier transistors to the second input electrodes of both of the unbalance amplifier transistors. When the forward and reverse input signals are unequal, the total signal applied across the first and second input electrodes of one unbalance amplifier transistor remains unchanged and keeps the transistor nonconductive, and the total signal applied across the first and second input electrodes of the other unbalance amplifier transistor is equal to the difference between the outputs of the two differential amplifier transistors. Means including silicon controlled rectifiers and a reversible A.C. motor utilize the outputs of the unbalance amplifier to provide rotation of a tape reel in a direction and at a speed determined by the direction and degree of unbalance of the forward and reverse signals.

BACKGROUND OF THE INVENTION

Paper tape and magnetic tape readers used with data processing equipment are required to move the tape intermittently and reversibly past a reading station at such a high speed that the feed-out and take-up reels cannot exactly accommodate the changing speed of the tape due to inertia in the reels and the tape thereon. It is therefore necessary to employ variable tape loops adjacent the reels for the purpose of absorbing momentary differences between the speed of the tape at the reading station and the speed of the tape being wound or unwound from the reel. The length of the tape in the variable loop is sensed to provide an electrical signal for controlling the speed and direction of rotation of the motors driving the tape reels.

Known tape loop servo systems have conventionally employed direct current motors because of the ease with which they can be reversed in direction of rotation. However, direct current motors include a commutator and brushes which present a maintenance problem that can be avoided by the use of reversible alternating current motors. Alternating current (A.C.) motors can conveniently and effectively be controlled in speed and direction of rotation by known silicon controlled rectifier circuits.

However, the use in tape loop servo systems of silicon controlled rectifiers and reversible alternating current motors has not enjoyed extensive commercial use because of the danger that a misadjustment or malfunction of the system may cause a catastrophic failure in the form of a short circuit across the alternating current power line source. Such a short circuit can occur if the servo system electronics erroneously permits the simultaneous application of "forward" and "reverse" signals to the silicon-controlled rectifier circuit.

It is therefore an object of this invention to provide an improved tape loop servo system including a reversible alternating current motor, silicon-controlled rectifiers, and loop sense electronics constructed to insure that "forward" and "reverse" signals will never be simultaneously applied to the silicon-controlled rectifiers.

It is another object to provide an improved electronic amplifier for receiving two servo signals having amplitudes which are equal when no motion is called for and having amplitudes which are unequal when motion in one direction or the other is called for, and for providing forward and reverse output signals which are both zero when no motion is called for and of which solely one at a time has an amplitude other than zero when motion in one direction or the other is called for.

It is a further object to provide an improved circuit including a differential amplifier followed by an unbalance amplifier.

BRIEF SUMMARY OF THE INVENTION

A differential amplifier includes two normally-conducting transistors. An unbalance amplifier includes two normally-nonconducting transistors each having first and second input electrodes. The first input electrodes of the unbalance amplifier transistors are receptive to outputs from respective ones of the differential amplifier transistors. The second input electrodes of both unbalance amplifier transistors are receptive to the equal or greater one of the outputs of the differential amplifier transistors through a circuit including additional unidirectional conducting and amplifying devices.

BRIEF DESCRIPTION OF THE DRAWINGS

The sole figure of the drawing shows a tape reel drive servo system, constructed according to the teachings of the invention.

DETAILED DESCRIPTION

Referring now in greater detail to the drawing, a tape 10, such as a punched paper tape, is wound and unwound from a tape reel 11 by means of a reversible A.C. motor 12. The tape 10 passes over a fixed roller 13 and over a movable roller 14 which forms a variable length tape loop between the fixed roller 13 and the tape reel 11. The variable tape loop acts as a buffer in absorbing momentary differences in speed of the straight portion of the tape 10 relative to the portion being wound or unwound from the reel 11. The movable roller 14 is mounted on a storage arm 15 which is pivoted to transmit a proportional movement through a linkage 16 to the movable core of a motion transducer 17. A tension spring 18 is connected through the movable core in transducer 17 and the linkage 16 to the storage arm 15 to taking up slack in the tape between the tape reel 11 and the fixed roller 13. The free end of the tape 10 passes through a tape reading head (not shown) and on to another tape reel drive servo system like the one shown in the drawing.

The transducer 17 is of a known type including a moveable magnetic core related with a stationary primary coil to which the output of a 400 Hz. transistor oscillator 19 is applied. The transducer 17 also includes two stationary longitudinally-spaced secondary coils having respective output conductor pairs 20 and 21. The secondary coils are physically positioned so that equal amplitude signals are induced on the two secondary coils when the moveable core is centrally located in the transducer 17. When the moveable core is displaced by the linkage 16 from its central location, unequal signals are induced in the secondary coils in accordance with the direction and extent of the displacement of the moveable core from the central location. The 400 Hz. signals on the conductor pairs 20 and 21 thus have relative amplitudes indicating the direction and speed at which the reversible A.C. motor 12 should operate in order to maintain the tape loop at its intermediate size shown in the drawing.

The 400 Hz. signals on conductor pairs 20 and 21 are applied to conventional circuits 22 which include rectifiers, filters and impedance transforming circuits. The outputs 23 and 24 of the circuits 22 are direct current signals having relative amplitudes representing a needed amount of forward or reverse rotation of the tape reel 11. In the balanced condition of the system, when no rotation of the tape reel 11 is called for, the direct current voltages on lines 23 and 24 are equal and both may be +5 volts, according to an actually constructed equipment constituting an example of the invention.

The forward and reverse signals on lines 23 and 24 are applied to respective inputs of a differential amplifier including transistors Q1 and Q2. A constant current source, including a transistor Q3, is connected to the emitter circuits of transistors Q1 and Q2. The collectors of transistors Q1 and Q2 are connected to a +30 v. bias source terminal through series resistors R1 and R2. Resistors R1 may have a value of 240 ohms, and resistors R2 may have a value of 1000 ohms. The differential amplifier transistors Q1 and Q2 are biased to be always conductive, with the total current divided between both transistors being a fixed amount, such as 10 ma., determined by the constant current circuit including transistor Q3. In the balanced condition, transistors Q1 and Q2 each conduct 5 ma. When input signals to the bases of the transistors Q1 and Q2 are unequal, one transistor conducts a greater amount and the other transistor conducts a lesser amount, with the total conduction equaling the illustrative 10 ma.

The output signals from the collector output electrodes of the differential amplifier transistors Q1 and Q2 are connected respectively over lines 25 and 26 to the base input electrodes of transistors Q4 and Q5 of an unbalance amplifier employed as a trigger control circuit. Transistors Q4 and Q5 are biased so that both transistors are nonconductive when balanced (equal) signals are supplied to the bases of the transistors from the differential amplifier. The means for biasing transistors Q4 and Q5 include collector output resistors R3 connected to the +30 v. bias source terminal. The biasing means also includes a transistor Q6 having its emitter output electrode connected to the junction point A between the equal emitter resistors R4 of transistors Q4 and Q5. The base input electrode of transistor Q6 is connected through a rectifier 27 to a junction point B in the collector output circuit of transistor Q1, and is connected through a rectifier 28 to a junction point C in the collector output circuit of transistor Q2.

The circuit of transistor Q6 provides operating bias for transistors Q4 and Q5, and it also provides a signal coupling to transistors Q4 and Q5. The circuit of transistor Q6 is constructed so that when equal signals are applied to the bases of transistors Q1 and Q2, and correspending equal signals are applied over lines 25 and 26 to the bases of transistors Q4 and Q5, transistors Q4 and Q5 are both nonconductive. However, when unbalanced signals are applied over lines 25 and 26 to transistors Q4 and Q5, one or the other, but not both, of the transistors Q4 and Q5 is made conductive, as will be described later.

The collectors of transistors Q4 and Q5 are connected through respective capacitors C8 and C9 to ground. Capacitors C8 and C9 may each have a value of 1.0 microfarad. Capacitors C8 and C9 are charged through respective collector resistors R3 from the collector bias source terminals +30 v. Resistors R3 may each have a value of 20,000 ohms, so that, when transistors Q4 and Q5 are nonconductive, the capacitors charge to a value of slightly less than about one-half the bias voltage of +30 volts in a period of time corresponding with a half cycle of the 60 Hz. line voltage.

The capacitors C8 and C9 are periodically discharged at the time of each zero crossing of the 60 Hz. line voltage. This is accomplished by a full wave rectifier 30 which supplies negative half cycles of the 60 Hz. line voltage through a level shifting circuit 31 to the base of a transistor Q7. The transistor Q7 is thus made fully conductive solely during short intervals occurring at the times at which the 60 Hz. line voltage crosses the zero axis. The emitter of discharge transistor Q7 is connected to ground, and the collector of transistor Q7 is coupled through a diode 33 to the high side 34 of a capacitor C8, and is coupled through diode 35 to the high side 36 of capacitor C9. When transistor Q7 is momentarily rendered conductive, both of capacitors C8 and C9 are discharged to ground potential.

The signal outputs on lines 34 and 36 from transistors Q4 and Q5 are applied to the emitters of respective unijunction transistors Q8 and Q9. The upper base terminals of unijunction transistors Q8 and Q9 are each biased at about 22 volts by temperature-compensating voltage divider resistors R4 and R5, which may have values of 340 ohms and 1270 ohms, respectively. The lower base terminals of unijunction transistors Q8 and Q9 are connected to the primary coils 37 of respective transformers T1 and T2. The primary coils are shunted by diodes 38 which are poled to provide a discharge path for reactive currents generated in the primary coils.

Transformer T1 has four secondary coils numbered 1 through 4. Secondary coil 1 is shown connected to a correspondingly-numbered silicon controlled rectifier in a reversing line switch 40. Secondary coils 2, 3 and 4 are similarly connected by wires (not shown) to silicon controlled rectifiers 2, 3 and 4, respectively. Similarly, transformer T2 has four secondary coils numbered 5 through 8 which are connected by wires (not shown) to correspondingly-numbered silicon controlled rectifiers in the reversing line switch 40. In each case, a secondary coil is connected across the control and cathode terminals of the respective silicon controlled rectifier. The terminals 42 and 43 of the reversing line switch 40 are connected to the 60 Hz. alternating current line source, which is the same source (same in frequency and phase) as the source connected to the discharge circuit 30, 31 and Q7. One winding of the reversible A.C. motor 12 is connected over line 44 and through a 90-degree phase shifting capacitor 45 to the 60 Hz. A.C. line. The other winding of the reversible A.C. motor 12 is connected over line 48 to the terminals 46 and 47 of the reversing line switch 40.

The connnections of the transformers T1 and T2 and the silicon controlled rectifiers in the reversing line switch 40 are such that when the secondary coils of transformer T1 are energized, the silicon controlled rectifiers 1 through 4 permit alternating current line voltage of one phase (relative to the source) to be applied at 48 to the reversible motor 12. On the other hand, when the secondary windings of transformer T2 are energized, the silicon controlled rectifiers 5 through 8 permit alternating current line voltage of the opposite phase to be applied at 48 to reversible motor 12. In this way, the direction of rotation of the motor 12 is determined by conduction in one or the other of the unijunction transistors Q8 and Q9. The speed of rotation in a selected direction is determined by the times during each 60 Hz. alternating line voltage cycle at which the silicon controlled rectifiers are fired.

OPERATION

The transducer 17 and circuits 22 produce "forward" and "reverse" signals on lines 23 and 24, respectively, which are applied to the base electrodes of differential amplifier transistors Q1 and Q2. When the forward and reverse signals are of equal amplitude, the transistors Q1 and Q2 conduct equally and equal signals are present at the collectors of transistors Q1 and Q2. The signal at the collector of transistor Q1 is coupled directly over line 25 to the base of transistor Q4, and is also coupled through a patch including resistor R1, diode 27, transistor Q6 and resistor R4 to the emitter electrode of transistor Q4. The value of resistor R1 (240 ohms) is selected to offset the slight voltage drops in diode 27 and conducting transistor Q6, so that the two voltages supplied over two paths to the base and emitter input electrodes of transistor Q4, from the collector of transistor Q1, are equal, or are slightly unequal in the reverse biasing direction. This being the case, the transistor Q4 is maintained in a nonconducting condition. What has been said about the coupling from transistor Q1 to transistor Q4 applies also to the coupling from transistor Q2 to transistor Q5. To summarize, when no motion of the drive motor 11 is called for, the input "forward" and "reverse" signals are equal, differential amplifier transistors Q1 and Q2 conduct equally, and unbalance amplifier transistors Q4 and Q5 are both maintained nonconductive.

If the transducer 17 senses the need for forward motion of the drive motor 11, the "forward" signal applied to the base of transistor Q1 increases, and the "reverse" signal applied to the base of transistor Q2 decreases proportionally. Transistor Q1 conducts more, and its collector voltage drops and tends to make transistor Q4 conduct. Transistor Q2 conducts less, and its collector voltage rises and tends to keep transistor Q5 nonconductive. The rising voltage at the collector of transistor Q2 is also coupled through resistor R1, diode 28, transistor Q6 and resistor R4 to the emitter of transistor Q4 where the change is in a direction to further increase the conduction in transistor Q4. The total signal applied across the base and emitter electrodes of transistor Q4 is equal to the difference between the oppositely-changed outputs of transistor Q1 and Q2. In this way, an extra desired amplification of the unbalance signal is obtained.

When transistor Q4 is rendered conductive, as described, transistor Q5 must be kept nonconductive, in spite of the fact that the rising voltage coupled from transistor Q2 to the emitter of transistor Q4 to make it conduct more is also applied to the emitter of transistor Q5 where it tends to make transistor Q5 conduct. But, transistor Q5 is maintained nonconductive because a substantially equal rising voltage is applied to the base of transistor Q5 over line 26 from transistor Q2. The total signal applied across the base and emitter input electrodes of transistor Q5 remains substantially unchanged and keeps transistor Q5 nonconductive. In this way, simultaneous conduction in both of transistors Q4 and Q5 is positively prevented. The operation of the system is unaffected by variations in the +30 v. power supply because proper relative voltage relationships are maintained in the circuits. The system is also unaffected by 400 Hz. ripple that may be present on signal input lines 23 and 24. What has been said about the operation when a "forward" motion of the drive motor is called for applies as well, with appropriate transpositions, when a "reverse" motion is called for.

It should be noted that when the input signals to transistors Q1 and Q2 are equal, the signals at points B and C are equal. The equal signals determine the voltage at point D, the conduction in transistor Q6, and the voltage at point A. On the other hand, when the input signals to transistors Q1 and Q2 are unequal, the signals at B and C are unequal and the greater one of the signals at B and C passes through a corresponding diode 27 or 28 to determine the voltage at point D, the conduction in transistor Q6, and the voltage at point A. More specifically, a "forward" signal increasing conduction in transistor Q1 is accompanied by greater voltage at point C in the collector circuit of transistor Q2 and a coupling of this greater voltage through diode 28 and transistor Q6 to the emitters of transistors Q4 and Q5. A "reverse" signal increasing conduction in transistor Q2 is accompanied by a greater voltage at point B in the collector circuit of transistors Q1 and a coupling of this greater voltage through diode 27 and transistor Q6 to the emitters of transistors Q4 and Q5.

Thus, the equal outputs of transistors Q1 and Q2 are coupled through diodes 27 and 28 to transistors Q4 and Q5. Or, the greater one of the outputs of transistors Q1 and Q2 is coupled through diode 27 or diode 28 to transistors Q4 and Q5. The term "greater" as applied to the signals is not limited to any particular polarity, and it means having a greater amplitude in a direction tending to add to the effect, in the selected or conducting one of transistors Q4 and Q5, of the signals applied over the other path to the other input electrode of the selected transistor.

The described construction of the differential amplifiers Q1, Q2, the unbalance amplifiers Q4, Q5 and the couplings therebetween provide a mode of operation in which transistors Q4 and Q5 are both nonconductive when no motion is called for, a respective one of transistors Q4 and Q5 is rendered conductive with extra vigor when a corresponding direction of motion is called for, and one and only one of transistors Q4 and Q5 can be conductive at any one instant of time. This is achieved in the described construction without the use of variable resistors requiring adjustment and readjustment. The circuit, once constructed, operates indefinitely in the desired manner without the need for, and dangers inherent in, adjustable components. It is merely desirable that the circuit be constructed using resistors R1, R2 and R3 having desired values within a 1% tolerance. The other resistors may have the usual 5% tolerance.

When transistors Q4 and Q5 are both nonconductive, capacitors C8 and C9 are charged through resistors R3 from the +30 v. source. The capacitors are discharged by discharge circuit 30, 31 and Q7 before the charge on the capacitors reach a value sufficiently high to render unijunction transistors Q8 and Q9 conductive. On the other hand, when transistor Q4 is conductive, capacitor C8 is charged more rapidly so that it reaches a value which activates unijunction transistor Q8 before the capacitor is discharged by the periodically operating discharge circuit. The activated unijunction transistor Q8 then triggers silicon controlled rectifiers 1 through 4, which pass A.C. power to the motor in a phase causing forward rotation of the A.C. motor 12. The amount of conduction in transistor Q4 determines how soon in every A.C. power half-cycle that the transistor Q8 and the silicon controlled rectifiers are fired. The earlier the firing, the more power is supplied to the motor and the faster it is made to rotate. What has been said about the results of conduction in transistor Q4 applies also to the results of conduction in transistor Q5 with regard to unijunction transistor Q9 and silicon controlled rectifiers 5 through 8 when a reverse direction of motion is called for.

It can be seen that if transistors Q4 and Q5 were ever both allowed to be conductive at the same time, unijunction transistors Q8 and Q9 would both conduct, and all of silicon controlled rectifiers 1 through 8 would be fired at the same time. This would cause a catastrophic short circuit to be placed across the A.C. power line source.

What is claimed is:

1. The combination of a differential amplifier including two amplifying devices, an unbalance amplifier including two amplifying devices each having an input coupled to the output of a respective amplifier device in said differential amplifier and each having a separate output coupled to a separate utilization means, and means including an additional amplifying device coupling the equal or greater one of the outputs of the ampifying devices in the differential amplifier to inputs of both amplifying devices in the unbalance amplifier.

2. The combination defined by claim 1 wherein said amplifying devices are transistors each having input and output electrodes.

3. The combination defined by claim 2 wherein said differential amplifier transistors are biased to be normally conducting.

4. The combination defined by claim 3 wherein said unbalance amplifier transistors are biased to be normally nonconductive.

5. The combination defined by claim 4 wherein each transistor in said unbalance amplifier has two input electrodes of which one is coupled to he output of the respective amplifier device in said differential amplifier and of which the other is coupled to the output of said means including an additional amplifying device.

6. The combination defined by claim 5 wherein said means including an additional amplifying device also includes unidirectional conduction devices coupling outputs of respective amplifier devices in said differential amplifier to the input of said additional amplifying device.

7. The combination of a differential amplifier including two normally-conducting transistors each having input and output electrodes, an unbalance amplifier including two normally-nonconducting transistors each having first and second input electrodes, said first input electrodes being receptive to outputs from respective ones of said differential amplifier transistors, and means including two diodes and an additional transistor coupling the equal or greater one of the outputs of said differential amplifier transistors to said second input electrodes of both of said unbalance amplifier transistors.

8. The combination of a differential amplifier including two normally-conducting transistors each having an output electrode, an unbalance amplifier including two normally-nonconducting transistors each having first and second input electrodes, said first input electrodes being coupled to output electrodes of respective ones of said differential amplifier transistors, an additional transistor having an input electrode and having an output electrode coupled to input electrodes of both of said unbalance amplifier transistors, and two diodes coupled from output electrodes of respective differential amplifier transistors to the input electrode of said additional transistor, whereby the total signal applied across the first and second input electrodes of one unbalance amplifier transistor remains unchanged and keeps the transistor nonconductive, and the total signal applied across the first and second input electrodes of the other unbalance amplifier transistor is equal to the difference between the outputs of the two differential amplifier transistors.

References Cited

UNITED STATES PATENTS 3,077,566 2/1963 Vosteen ............. 330—14

JOHN KOMINSKI, Primary Examiner

L. J. DAHL, Assistant Examiner

U.S. Cl. X.R.

330—69, 147